United States Patent [19]
Bloom

[11] Patent Number: 6,101,036
[45] Date of Patent: Aug. 8, 2000

[54] EMBOSSED DIFFRACTION GRATING ALONE AND IN COMBINATION WITH CHANGEABLE IMAGE DISPLAY

[75] Inventor: David M. Bloom, Palo Alto, Calif.

[73] Assignee: Silicon Light Machines, Sunnyvale, Calif.

[21] Appl. No.: 09/103,353

[22] Filed: Jun. 23, 1998

[51] Int. Cl.$^7$ ..................................................... G02B 5/18
[52] U.S. Cl. .......................... 359/567; 359/566; 359/572; 345/9; 345/31; 345/108; 348/771; 353/30
[58] Field of Search ..................................... 359/567, 572, 359/31, 560, 561, 569, 566; 353/30, 35; 345/7, 9, 31, 108; 348/750, 755, 757, 771; 349/201

[56] References Cited

U.S. PATENT DOCUMENTS

| | | |
|---|---|---|
| Re. 16,767 | 10/1927 | Jenkins . |
| Re. 25,169 | 5/1962 | Glenn . |
| 1,525,550 | 2/1925 | Jenkins . |
| 1,548,262 | 8/1925 | Freedman . |
| 1,814,701 | 7/1931 | Ives . |

(List continued on next page.)

FOREIGN PATENT DOCUMENTS

| | | | |
|---|---|---|---|
| 0 261 901 A2 | 3/1988 | European Pat. Off. | ......... G09G 3/36 |
| 0 306 308 A2 | 3/1989 | European Pat. Off. | ......... H04N 3/14 |
| 0 627 644 A3 | 9/1990 | European Pat. Off. | ........ G02B 27/00 |
| 0 417 639 A1 | 3/1991 | European Pat. Off. | ........ G03B 21/20 |
| 0 477 566 A2 | 4/1992 | European Pat. Off. | ........ G02B 26/08 |

(List continued on next page.)

OTHER PUBLICATIONS

Rowe, D.P. et al., "Laser Beam Scanning," SPIE, vol. 2088, Oct. 5, 1993, pp. 18–26.

Hornbeck, L.J., "Deformable–Mirror Spatial Light Modulators," SPIE Critical Reviews Series vol. 1150 Spatial Light Modulators and Applications III, Aug. 8, 1989, pp. 86–102.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

Russick et al., "Supercritical Carbon Dioxide Extraction of Solvent from Micromachined Structures," Supercritical Fluids, Chapter 18, pp. 255–269, 1997.

(List continued on next page.)

*Primary Examiner*—Cassandra Spyrou
*Assistant Examiner*—John Juba, Jr.
*Attorney, Agent, or Firm*—Haverstock & Owens LLP

[57] ABSTRACT

A static diffracting grating display system provides a fixed image representing high digital content information. A plurality of physical diffracting features are fixed into the surface of a substrate. The diffracting features are positioned and oriented to selectively diffract or reflect a first incident beam of light which is then collected by a first display optical system. For color, preferably three light sources, red, green and blue, are used to form three incident beams of light. The period between adjacent ones of the diffracting features can be adjusted to appropriately form full-color image from the collected light. Preferably the diffracting features are formed by embossing a deformable substrate. Where the material of the deformable substrate is not reflective, a reflective coating is then applied. In some circumstances a protective overcoat applied over the reflective surface to obviate scratches or other damage to the diffracting features of the embossed surface. The diffracting features can also be formed using photolithographic techniques. To display changeable information in the image, a selectively deformable diffraction grating light valve is provided. A second incident beam of light is provided to illuminate the deformable diffraction grating light valve. A second display optical system collects light from the deformable diffraction grating light valve and merges this light with that collected from the static diffracting grating display system to form a unitary display.

16 Claims, 11 Drawing Sheets

U.S. PATENT DOCUMENTS

| | | | |
|---|---|---|---|
| 2,415,226 | 2/1947 | Sziklai | 178/5.4 |
| 2,783,406 | 2/1957 | Vanderhooft | 313/70 |
| 2,991,690 | 7/1961 | Grey et al. | 88/16.6 |
| 3,553,364 | 1/1971 | Lee | 178/7.3 |
| 3,576,394 | 4/1971 | Lee | 178/7.3 |
| 3,600,798 | 8/1971 | Lee | 29/592 |
| 3,656,837 | 4/1972 | Sandbank | 350/161 |
| 3,743,507 | 7/1973 | Ih et al. | 359/31 |
| 3,781,465 | 12/1973 | Ernstoff et al. | 178/5.4 BD |
| 3,783,184 | 1/1974 | Ernstoff et al. | 178/5.4 BD |
| 3,802,769 | 4/1974 | Rotz et al. | 352/43 |
| 3,862,360 | 1/1975 | Dill et al. | 178/7.3 D |
| 3,886,310 | 5/1975 | Guldberg et al. | 178/7.5 D |
| 3,896,338 | 7/1975 | Nathanson et al. | 315/373 |
| 3,915,548 | 10/1975 | Opittek et al. | |
| 3,935,499 | 1/1976 | Oess | 313/413 |
| 3,935,500 | 1/1976 | Oess et al. | 313/495 |
| 3,943,281 | 3/1976 | Keller et al. | 178/7.5 D |
| 3,947,105 | 3/1976 | Smith | 353/121 |
| 3,969,611 | 7/1976 | Fonteneau | 219/502 |
| 3,991,416 | 11/1976 | Byles et al. | 340/324 R |
| 4,001,663 | 1/1977 | Bray | 321/2 |
| 4,006,968 | 2/1977 | Ernstoff et al. | |
| 4,009,939 | 3/1977 | Okano | 350/162 SF |
| 4,012,116 | 3/1977 | Yevick | 350/132 |
| 4,017,158 | 4/1977 | Booth | 350/162 SF |
| 4,020,381 | 4/1977 | Oess et al. | 313/302 |
| 4,034,211 | 7/1977 | Horst et al. | 359/572 |
| 4,067,129 | 1/1978 | Abramson et al. | 40/563 |
| 4,084,437 | 4/1978 | Finnegan | 73/361 |
| 4,090,219 | 5/1978 | Ernstoff et al. | 358/59 |
| 4,093,346 | 6/1978 | Nishino et al. | 350/162 SF |
| 4,093,921 | 6/1978 | Buss | 325/459 |
| 4,093,922 | 6/1978 | Buss | 325/459 |
| 4,100,579 | 7/1978 | Ernstoff | 358/230 |
| 4,127,322 | 11/1978 | Jacobson et al. | 353/31 |
| 4,135,502 | 1/1979 | Peck | 128/76.5 |
| 4,139,257 | 2/1979 | Matsumoto | 350/6.1 |
| 4,163,570 | 8/1979 | Greenaway | 283/8 A |
| 4,184,700 | 1/1980 | Greenaway | 283/6 |
| 4,185,891 | 1/1980 | Kaestner | |
| 4,195,915 | 4/1980 | Lichty et al. | |
| 4,205,428 | 6/1980 | Ernstoff et al. | 29/592 R |
| 4,211,918 | 7/1980 | Nyfeler et al. | 235/454 |
| 4,223,050 | 9/1980 | Nyfeler et al. | 427/163 |
| 4,225,913 | 9/1980 | Bray | 363/97 |
| 4,250,217 | 2/1981 | Greenaway | 428/161 |
| 4,250,393 | 2/1981 | Greenaway | 250/566 |
| 4,256,787 | 3/1981 | Shaver et al. | 428/1 |
| 4,311,999 | 1/1982 | Upton et al. | 340/755 |
| 4,327,411 | 4/1982 | Turner | 164/900 |
| 4,327,966 | 5/1982 | Bloom | 350/162 R |
| 4,338,660 | 7/1982 | Kelley et al. | 364/200 |
| 4,343,535 | 8/1982 | Bleha, Jr. | |
| 4,361,384 | 11/1982 | Bosserman | 350/174 |
| 4,374,397 | 2/1983 | Mir | 358/75 |
| 4,389,096 | 6/1983 | Hori et al. | |
| 4,408,884 | 10/1983 | Kleinknecht et al. | 356/355 |
| 4,418,397 | 11/1983 | Brantingham et al. | 364/900 |
| 4,420,717 | 12/1983 | Wallace et al. | 318/696 |
| 4,430,584 | 2/1984 | Someshwar et al. | 307/465 |
| 4,440,839 | 4/1984 | Mottier | 430/2 |
| 4,443,819 | 4/1984 | Funada et al. | 358/236 |
| 4,443,845 | 4/1984 | Hamilton et al. | 364/200 |
| 4,447,881 | 5/1984 | Brantingham et al. | 364/488 |
| 4,454,591 | 6/1984 | Lou | 364/900 |
| 4,462,046 | 7/1984 | Spight | 359/560 |
| 4,468,725 | 8/1984 | Venturini | 363/160 |
| 4,484,188 | 11/1984 | Ott | 340/728 |
| 4,492,435 | 1/1985 | Banton et al. | 350/360 |
| 4,503,494 | 3/1985 | Hamilton et al. | 364/200 |
| 4,556,378 | 12/1985 | Nyfeler et al. | 425/143 |
| 4,561,044 | 12/1985 | Ogura et al. | 362/84 |
| 4,566,935 | 1/1986 | Hornbeck | 156/626 |
| 4,571,041 | 2/1986 | Gaudyn | 353/10 |
| 4,571,603 | 2/1986 | Hornbeck et al. | 346/160 |
| 4,590,548 | 5/1986 | Maytum | 363/161 |
| 4,594,501 | 6/1986 | Culley et al. | 219/492 |
| 4,596,992 | 6/1986 | Hornbeck | 346/76 PH |
| 4,615,595 | 10/1986 | Hornbeck | 353/122 |
| 4,623,219 | 11/1986 | Trias | 350/351 |
| 4,636,866 | 1/1987 | Hattori | 358/236 |
| 4,641,193 | 2/1987 | Glenn | 358/233 |
| 4,645,881 | 2/1987 | LeToumelin et al. | 379/252 |
| 4,646,158 | 2/1987 | Ohno et al. | 358/236 |
| 4,652,932 | 3/1987 | Miyajima et al. | 358/236 |
| 4,655,539 | 4/1987 | Caulfield et al. | 350/3.6 |
| 4,662,746 | 5/1987 | Hornbeck | 350/269 |
| 4,663,670 | 5/1987 | Ito et al. | 358/245 |
| 4,687,326 | 8/1987 | Corby, Jr. | 356/5 |
| 4,698,602 | 10/1987 | Armitage | 332/7.51 |
| 4,709,995 | 12/1987 | Kuribayashi et al. | 350/350 S |
| 4,710,732 | 12/1987 | Hornbeck | 332/7.51 |
| 4,714,326 | 12/1987 | Usui et al. | 350/485 |
| 4,719,507 | 1/1988 | Bos | 358/92 |
| 4,722,593 | 2/1988 | Shimazaki | 350/336 |
| 4,728,185 | 3/1988 | Thomas | 353/122 |
| 4,744,633 | 5/1988 | Sheiman | 350/132 |
| 4,747,671 | 5/1988 | Takahashi et al. | 350/336 |
| 4,751,509 | 6/1988 | Kubota et al. | 340/784 |
| 4,761,253 | 8/1988 | Antes | 264/1.3 |
| 4,772,094 | 9/1988 | Sheiman | 350/133 |
| 4,797,694 | 1/1989 | Agostinelli et al. | 346/160 |
| 4,801,194 | 1/1989 | Agostinelli et al. | |
| 4,803,560 | 2/1989 | Matsunaga et al. | 358/236 |
| 4,807,965 | 2/1989 | Garakani | 350/131 |
| 4,809,078 | 2/1989 | Yabe et al. | 358/236 |
| 4,811,210 | 3/1989 | McAulay | 364/200 |
| 4,814,759 | 3/1989 | Gombrich et al. | 340/771 |
| 4,827,391 | 5/1989 | Sills | 363/41 |
| 4,829,365 | 5/1989 | Eichenlaub | 358/3 |
| 4,856,863 | 8/1989 | Sampsell et al. | 350/96.16 |
| 4,856,869 | 8/1989 | Sakata et al. | 350/162.18 |
| 4,859,012 | 8/1989 | Cohn | 350/96.24 |
| 4,866,488 | 9/1989 | Frensley | 357/4 |
| 4,915,463 | 4/1990 | Barbee, Jr. | 350/1.1 |
| 4,915,479 | 4/1990 | Clarke | 350/345 |
| 4,934,773 | 6/1990 | Becker | 350/6.6 |
| 4,952,925 | 8/1990 | Haastert | 340/784 |
| 4,954,789 | 9/1990 | Sampsell | 330/4.3 |
| 4,956,619 | 9/1990 | Hornbeck | 330/4.3 |
| 4,978,202 | 12/1990 | Yang | 350/331 R |
| 4,982,184 | 1/1991 | Kirkwood | 340/783 |
| 4,984,824 | 1/1991 | Antes et al. | 283/91 |
| 5,003,300 | 3/1991 | Wells | 340/705 |
| 5,013,141 | 5/1991 | Sakata | 350/348 |
| 5,018,256 | 5/1991 | Hornbeck | 29/25.01 |
| 5,022,750 | 6/1991 | Flasck | 353/31 |
| 5,024,494 | 6/1991 | Williams et al. | 350/36 |
| 5,028,939 | 7/1991 | Hornbeck | 346/160 |
| 5,035,473 | 7/1991 | Kuwayama et al. | 350/37 |
| 5,037,173 | 8/1991 | Sampsell et al. | 385/17 |
| 5,041,851 | 8/1991 | Nelson | 346/160 |
| 5,048,077 | 9/1991 | Wells et al. | 379/96 |
| 5,058,992 | 10/1991 | Takahashi | 359/567 |
| 5,060,058 | 10/1991 | Goldenberg et al. | 358/60 |
| 5,061,049 | 10/1991 | Hornbeck | 359/224 |
| 5,072,239 | 12/1991 | Mitcham et al. | 346/108 |
| 5,072,418 | 12/1991 | Boutaud et al. | 364/715.06 |
| 5,079,544 | 1/1992 | DeMond et al. | 340/701 |
| 5,083,857 | 1/1992 | Hornbeck | 359/291 |
| 5,089,903 | 2/1992 | Kuwayama et al. | 359/15 |

| | | | | | | | | |
|---|---|---|---|---|---|---|---|---|
| 5,096,279 | 3/1992 | Hornbeck et al. | 359/230 | | 5,285,407 | 2/1994 | Gale et al. | 365/189.11 |
| 5,099,353 | 3/1992 | Hornbeck | 359/291 | | 5,287,096 | 2/1994 | Thompson et al. | 345/147 |
| 5,101,184 | 3/1992 | Antes | 235/454 | | 5,287,215 | 2/1994 | Warde et al. | 359/293 |
| 5,101,236 | 3/1992 | Nelson et al. | 355/229 | | 5,289,172 | 2/1994 | Gale, Jr. et al. | 345/108 |
| 5,105,207 | 4/1992 | Nelson | 346/160 | | 5,291,317 | 3/1994 | Newswanger | 359/15 |
| 5,105,299 | 4/1992 | Anderson et al. | 359/223 | | 5,291,473 | 3/1994 | Pauli | 369/112 |
| 5,105,369 | 4/1992 | Nelson | 364/525 | | 5,293,511 | 3/1994 | Poradish et al. | 257/434 |
| 5,113,272 | 5/1992 | Reamey | 359/53 | | 5,296,891 | 3/1994 | Vogt et al. | 355/67 |
| 5,113,285 | 5/1992 | Franklin et al. | 359/465 | | 5,296,950 | 3/1994 | Lin et al. | 359/9 |
| 5,119,204 | 6/1992 | Hashimoto et al. | 358/254 | | 5,299,037 | 3/1994 | Sakata | 359/41 |
| 5,121,343 | 6/1992 | Faris | 395/111 | | 5,299,289 | 3/1994 | Omae et al. | 359/95 |
| 5,128,660 | 7/1992 | DeMond et al. | 340/707 | | 5,301,062 | 4/1994 | Takahashi et al. | 359/567 |
| 5,129,716 | 7/1992 | Holakovszky et al. | 351/50 | | 5,303,055 | 4/1994 | Hendrix et al. | 348/761 |
| 5,132,812 | 7/1992 | Takahashi et al. | 359/9 | | 5,307,056 | 4/1994 | Urbanus | 340/189 |
| 5,142,303 | 8/1992 | Nelson | 346/108 | | 5,307,185 | 4/1994 | Jones et al. | 359/41 |
| 5,142,405 | 8/1992 | Hornbeck | 359/226 | | 5,311,349 | 5/1994 | Anderson et al. | 359/223 |
| 5,142,677 | 8/1992 | Ehlig et al. | 395/650 | | 5,311,360 | 5/1994 | Bloom et al. | 359/572 |
| 5,148,157 | 9/1992 | Florence | 340/783 | | 5,312,513 | 5/1994 | Florence et al. | 156/643 |
| 5,148,506 | 9/1992 | McDonald | 385/16 | | 5,313,479 | 5/1994 | Florence | 372/26 |
| 5,151,718 | 9/1992 | Nelson | 346/160 | | 5,313,648 | 5/1994 | Ehlig et al. | 395/800 |
| 5,151,724 | 9/1992 | Kikinis | 359/35 | | 5,315,418 | 5/1994 | Sprague et al. | 359/41 |
| 5,155,604 | 10/1992 | Miekka et al. | 359/2 | | 5,319,214 | 6/1994 | Gregory et al. | 250/504 R |
| 5,155,615 | 10/1992 | Tagawa | 359/213 | | 5,319,789 | 6/1994 | Ehlig et al. | 395/800 |
| 5,155,778 | 10/1992 | Magel et al. | 385/18 | | 5,319,792 | 6/1994 | Ehlig et al. | 395/800 |
| 5,155,812 | 10/1992 | Ehlig et al. | 395/275 | | 5,321,416 | 6/1994 | Bassett et al. | 345/8 |
| 5,159,485 | 10/1992 | Nelson | 359/291 | | 5,323,002 | 6/1994 | Sampsell et al. | 250/252.1 |
| 5,161,042 | 11/1992 | Hamada | 359/41 | | 5,325,116 | 6/1994 | Sampsell | 346/108 |
| 5,162,787 | 11/1992 | Thompson et al. | 340/794 | | 5,327,286 | 7/1994 | Sampsell et al. | 359/561 |
| 5,165,013 | 11/1992 | Faris | 395/104 | | 5,330,878 | 7/1994 | Nelson | 430/311 |
| 5,168,406 | 12/1992 | Nelson | 359/855 | | 5,331,454 | 7/1994 | Hornbeck | 359/224 |
| 5,170,156 | 12/1992 | DeMond et al. | 340/794 | | 5,339,116 | 8/1994 | Urbanus et al. | 348/716 |
| 5,170,269 | 12/1992 | Lin et al. | 359/9 | | 5,339,177 | 8/1994 | Jenkins et al. | 359/35 |
| 5,170,283 | 12/1992 | O'Brien et al. | 359/291 | | 5,345,521 | 9/1994 | McDonald et al. | 385/19 |
| 5,172,161 | 12/1992 | Nelson | 355/200 | | 5,347,321 | 9/1994 | Gove | 348/663 |
| 5,172,262 | 12/1992 | Hornbeck | 359/223 | | 5,347,378 | 9/1994 | Handschy et al. | 359/53 |
| 5,178,728 | 1/1993 | Boysel et al. | 156/656 | | 5,347,433 | 9/1994 | Sedlmayr | 362/32 |
| 5,179,274 | 1/1993 | Sampsell | 250/208.2 | | 5,348,619 | 9/1994 | Bohannon et al. | 156/664 |
| 5,179,367 | 1/1993 | Shimizu | 340/700 | | 5,349,687 | 9/1994 | Ehlig et al. | 395/800 |
| 5,181,231 | 1/1993 | Parikh et al. | 377/26 | | 5,351,052 | 9/1994 | D'Hont et al. | 342/42 |
| 5,182,665 | 1/1993 | O'Callaghan et al. | 359/95 | | 5,357,369 | 10/1994 | Pilling et al. | 359/462 |
| 5,192,864 | 3/1993 | McEwen et al. | 250/234 | | 5,359,349 | 10/1994 | Jambor et al. | 345/168 |
| 5,192,946 | 3/1993 | Thompson et al. | 340/794 | | 5,363,220 | 11/1994 | Kuwayama et al. | 359/3 |
| 5,202,785 | 4/1993 | Nelson | 359/214 | | 5,365,283 | 11/1994 | Doherty et al. | 348/743 |
| 5,206,629 | 4/1993 | DeMond et al. | 340/719 | | 5,367,585 | 11/1994 | Ghezzo et al. | 385/23 |
| 5,212,555 | 5/1993 | Stoltz | 358/206 | | 5,371,543 | 12/1994 | Anderson | 348/270 |
| 5,212,582 | 5/1993 | Nelson | 359/224 | | 5,371,618 | 12/1994 | Tai et al. | 359/53 |
| 5,214,419 | 5/1993 | DeMond et al. | 340/794 | | 5,382,961 | 1/1995 | Gale, Jr. | 345/108 |
| 5,214,420 | 5/1993 | Thompson et al. | 340/795 | | 5,387,924 | 2/1995 | Gale, Jr. et al. | 345/108 |
| 5,216,537 | 6/1993 | Hornbeck | 359/291 | | 5,389,182 | 2/1995 | Mignardi | 156/344 |
| 5,221,982 | 6/1993 | Faris | 359/93 | | 5,392,140 | 2/1995 | Ezra et al. | 359/41 |
| 5,226,099 | 7/1993 | Mignardi et al. | 385/19 | | 5,392,151 | 2/1995 | Nelson | 359/223 |
| 5,231,363 | 7/1993 | Sano et al. | 332/109 | | 5,398,071 | 3/1995 | Gove et al. | 348/558 |
| 5,231,388 | 7/1993 | Stoltz | 340/783 | | 5,404,485 | 4/1995 | Ban | 395/425 |
| 5,231,432 | 7/1993 | Glenn | 353/31 | | 5,410,315 | 4/1995 | Huber | 342/42 |
| 5,233,456 | 8/1993 | Nelson | 359/214 | | 5,411,769 | 5/1995 | Hornbeck | 427/534 |
| 5,237,340 | 8/1993 | Nelson | 346/108 | | 5,412,186 | 5/1995 | Gale | 219/679 |
| 5,237,435 | 8/1993 | Kurematsu et al. | 359/41 | | 5,418,584 | 5/1995 | Larson | 353/122 |
| 5,240,818 | 8/1993 | Mignardi et al. | 430/321 | | 5,420,655 | 5/1995 | Shimizu | 353/33 |
| 5,245,686 | 9/1993 | Faris et al. | 385/120 | | 5,430,524 | 7/1995 | Nelson | 355/200 |
| 5,247,180 | 9/1993 | Mitcham et al. | 250/492.1 | | 5,435,876 | 7/1995 | Alfaro et al. | 156/247 |
| 5,247,593 | 9/1993 | Lin et al. | 385/17 | | 5,442,411 | 8/1995 | Urbanus et al. | 348/771 |
| 5,254,980 | 10/1993 | Hendrix et al. | 345/84 | | 5,442,414 | 8/1995 | Janssen et al. | 353/98 |
| 5,255,100 | 10/1993 | Urbanus | 358/231 | | 5,444,566 | 8/1995 | Gale et al. | 359/291 |
| 5,256,869 | 10/1993 | Lin et al. | 250/201.9 | | 5,445,559 | 8/1995 | Gale et al. | 451/388 |
| 5,262,000 | 11/1993 | Wellbourn et al. | 156/643 | | 5,446,479 | 8/1995 | Thompson et al. | 345/139 |
| 5,272,473 | 12/1993 | Thompson et al. | 345/7 | | 5,447,600 | 9/1995 | Webb | 216/2 |
| 5,278,652 | 1/1994 | Urbanus et al. | 358/160 | | 5,448,314 | 9/1995 | Heimbuch et al. | 348/743 |
| 5,278,925 | 1/1994 | Boysel et al. | 385/14 | | 5,448,546 | 9/1995 | Pauli | 369/112 |
| 5,280,277 | 1/1994 | Hornbeck | 345/108 | | 5,450,088 | 9/1995 | Meier et al. | 342/51 |
| 5,281,887 | 1/1994 | Engle | 310/335 | | 5,450,219 | 9/1995 | Gold et al. | 359/40 |
| 5,281,957 | 1/1994 | Schoolman | 345/8 | | 5,451,103 | 9/1995 | Hatanaka et al. | 353/31 |
| 5,285,196 | 2/1994 | Gale, Jr. | 345/108 | | 5,452,024 | 9/1995 | Sampsell | 348/755 |

| | | | |
|---|---|---|---|
| 5,452,138 | 9/1995 | Mignardi et al. | 359/855 |
| 5,453,747 | 9/1995 | D'Hont et al. | 342/42 |
| 5,453,778 | 9/1995 | Venkateswar et al. | 347/239 |
| 5,453,803 | 9/1995 | Shapiro et al. | 353/119 |
| 5,454,906 | 10/1995 | Baker et al. | 216/66 |
| 5,455,602 | 10/1995 | Tew | 347/239 |
| 5,457,493 | 10/1995 | Leddy et al. | 348/164 |
| 5,457,566 | 10/1995 | Sampsell et al. | 359/292 |
| 5,458,716 | 10/1995 | Alfdro et al. | 156/245 |
| 5,459,492 | 10/1995 | Venkateswar | 347/253 |
| 5,459,528 | 10/1995 | Pettitt | 348/568 |
| 5,459,592 | 10/1995 | Shibatani et al. | 359/40 |
| 5,459,610 | 10/1995 | Bloom et al. | 359/572 |
| 5,461,410 | 10/1995 | Venkateswar et al. | 347/240 |
| 5,461,411 | 10/1995 | Florence et al. | 347/240 |
| 5,461,547 | 10/1995 | Ciupke et al. | 362/31 |
| 5,463,347 | 10/1995 | Jones et al. | 330/253 |
| 5,465,175 | 11/1995 | Woodgate et al. | 359/463 |
| 5,467,106 | 11/1995 | Salomon | 345/87 |
| 5,467,138 | 11/1995 | Gove | 348/452 |
| 5,467,146 | 11/1995 | Huang et al. | 348/743 |
| 5,469,302 | 11/1995 | Lim | 359/846 |
| 5,471,341 | 11/1995 | Warde et al. | 359/293 |
| 5,481,118 | 1/1996 | Tew | 250/551 |
| 5,482,564 | 1/1996 | Douglas et al. | 134/18 |
| 5,482,818 | 1/1996 | Nelson | 430/394 |
| 5,483,307 | 1/1996 | Anderson | 353/98 |
| 5,485,172 | 1/1996 | Sawachika et al. | 345/8 |
| 5,485,304 | 1/1996 | Kaeriyama | 359/291 |
| 5,485,354 | 1/1996 | Ciupke et al. | 362/31 |
| 5,486,698 | 1/1996 | Hanson et al. | 250/332 |
| 5,486,841 | 1/1996 | Hara et al. | 345/8 |
| 5,486,946 | 1/1996 | Jashimowicz et al. | 359/263 |
| 5,488,431 | 1/1996 | Gove et al. | 348/716 |
| 5,489,952 | 2/1996 | Gove et al. | 348/771 |
| 5,490,009 | 2/1996 | Venkateswar et al. | 359/291 |
| 5,491,510 | 2/1996 | Gove | 348/77 |
| 5,491,715 | 2/1996 | Flaxl | 375/344 |
| 5,493,439 | 2/1996 | Engle | 359/292 |
| 5,497,172 | 3/1996 | Doherty et al. | 345/85 |
| 5,497,197 | 3/1996 | Gove et al. | 348/388 |
| 5,497,262 | 3/1996 | Kaeriyama | 359/223 |
| 5,499,060 | 3/1996 | Gove et al. | 348/651 |
| 5,499,062 | 3/1996 | Urbanus | 348/771 |
| 5,500,761 | 3/1996 | Goossen et al. | 359/290 |
| 5,502,481 | 3/1996 | Dentinger et al. | 348/51 |
| 5,504,504 | 4/1996 | Markandey et al. | 345/214 |
| 5,504,514 | 4/1996 | Nelson | 347/130 |
| 5,504,575 | 4/1996 | Stafford | 356/330 |
| 5,504,614 | 4/1996 | Webb et al. | 359/223 |
| 5,506,171 | 4/1996 | Leonard et al. | 437/187 |
| 5,506,597 | 4/1996 | Thompson et al. | 345/85 |
| 5,506,720 | 4/1996 | Yoon | 359/224 |
| 5,508,750 | 4/1996 | Hewlett et al. | 348/558 |
| 5,508,840 | 4/1996 | Vogel et al. | 359/291 |
| 5,508,841 | 4/1996 | Lin et al. | 359/318 |
| 5,510,824 | 4/1996 | Nelson | 347/239 |
| 5,512,374 | 4/1996 | Wallace et al. | 428/422 |
| 5,512,748 | 4/1996 | Hanson | 250/332 |
| 5,515,076 | 5/1996 | Thompson et al. | 345/139 |
| 5,516,125 | 5/1996 | McKenna | 279/3 |
| 5,517,340 | 5/1996 | Doany et al. | 359/41 |
| 5,517,347 | 5/1996 | Sampsell | 359/224 |
| 5,517,359 | 5/1996 | Gelbart | 359/623 |
| 5,519,450 | 5/1996 | Urbanus et al. | 348/600 |
| 5,521,748 | 5/1996 | Sarraf | 159/321 |
| 5,523,803 | 6/1996 | Urbanus et al. | 348/771 |
| 5,523,878 | 6/1996 | Wallace et al. | 359/290 |
| 5,523,881 | 6/1996 | Florence et al. | 359/561 |
| 5,524,155 | 6/1996 | Weaver | 385/24 |
| 5,539,422 | 7/1996 | Heacock et al. | 345/8 |
| 5,623,361 | 4/1997 | Engle | 359/291 |
| 5,668,611 | 9/1997 | Ernstoff et al. | 348/771 |
| 5,704,700 | 1/1998 | Kappel et al. | 353/31 |
| 5,742,373 | 4/1998 | Alveda | 349/204 |
| 5,757,536 | 5/1998 | Ricco et al. | 359/224 |
| 5,768,009 | 6/1998 | Little | 359/293 |
| 5,926,309 | 7/1999 | Little | 359/293 |
| 5,949,570 | 9/1999 | Shiono et al. | 359/572 |

FOREIGN PATENT DOCUMENTS

| | | | |
|---|---|---|---|
| 0 488 326 A1 | 6/1992 | European Pat. Off. | G09G 2/28 |
| 0 528 646 A1 | 2/1993 | European Pat. Off. | G09G 3/02 |
| 0 530 760 A2 | 3/1993 | European Pat. Off. | G09G 3/34 |
| 0 550 189 A1 | 7/1993 | European Pat. Off. | G02F 1/315 |
| 0 610 665 A1 | 8/1994 | European Pat. Off. | G09G 3/34 |
| 0 627 644 A2 | 12/1994 | European Pat. Off. | G02B 27/00 |
| 0 627 850 A1 | 12/1994 | European Pat. Off. | H04N 5/64 |
| 0 643 314 A2 | 3/1995 | European Pat. Off. | G02B 27/00 |
| 0 654 777 A1 | 5/1995 | European Pat. Off. | G09G 3/34 |
| 0 658 868 A1 | 6/1995 | European Pat. Off. | G09G 3/34 |
| 0 689 078 A1 | 12/1995 | European Pat. Off. | G03B 26/08 |
| 0 801 319 A1 | 10/1997 | European Pat. Off. | G02B 26/00 |
| 63-305323 | 12/1988 | Japan | G02F 1/13 |
| 2-219092 | 8/1990 | Japan | G09G 3/28 |
| 2 118 365 | 10/1983 | United Kingdom | H01L 27/13 |
| 2 266 385 | 10/1993 | United Kingdom | G02B 23/10 |
| WO 92/12506 | 7/1992 | WIPO | G09F 9/37 |
| WO 93/02269 | 2/1993 | WIPO | E06B 5/10 |
| WO 93/09472 | 5/1993 | WIPO | G03F 7/20 |
| WO 93/18428 | 9/1993 | WIPO | G02B 27/00 |
| WO 95/11473 | 4/1995 | WIPO | G02B 27/00 |
| WO 96/08031 | 3/1996 | WIPO | H01J 29/12 |
| WO 96/41217 | 12/1996 | WIPO | G02B 5/18 |
| WO 96/41224 | 12/1996 | WIPO | G02B 19/00 |
| WO 97/26569 | 7/1997 | WIPO | G02B 5/18 |

OTHER PUBLICATIONS

Buhler et al., "Linear Array of Complementary Metal Oxide Semiconductor Double–Pass Metal Micromirrors," Optical Engineering, vol. 36, No. 5, pp. 1391–1398, May 1997.

Gani et al., "Variable Gratings for Optical Switching Rigorous Electromagnetic Simulation and Design," Optical Engineering, vol. 38, No. 3, pp. 552–557, Mar. 1999.

T. Iwai et al., "Real–time Profiling of a Pure Phase Object Using an Auto–Wigner Distribution Function," Optics Communications, vol. 95, nos. 4–6, Jan. 15, 1993, pp. 144–204.

R. Tepe, R. Gerhard–Multhaupt, W. Brinker and W. D. Molzow, "Viscoelastic Spatial Light Modulator with Active Matrix Addressing," Applied Optics, vol. 28, No. 22, New York, USA, pp. 4826–4834, Nov. 15, 1989.

W. Briker, R. Gerhard–Multhaupt, W. D. Molzow and R. Tepe, "Deformation Behavior of Thin Viscoelastic Layers Used in an Active–Matrix–Addressed Spatial Light Modulator," SPIE vol. 1018, pp. 79–85, Germany 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan 1980.

R. Apte, F. Sandejas, W. Benyai, D. Bloom, "Grating Light Valves For High Resolution Display", Ginzton Laboratories, Stanford University, Stanford, CA 94304–408, Jun. 1994.

R. Apte, "Grating Light Valves For High Resolution Displays," Jun., 1994 Report # 5192 Edward Ginzton Laboratory, Stanford Univ.

O. Solgaard, "Integrated Semiconductor Light Modulators For Fiber–Optic And Display Applications," Edward Ginzeth Laboratory, Stanford University Feb., 1992.

J. Neff, "Two–Dimensional Spatial Light Modulators: A Tutorial", Proceedings of the IEEE, vol. 78, No. 5, pp. 826–855, May,1990.

Gerhard–Multhaupt, "Viscoelastic Spatial Light Modulators and Schlieren–Optical Systems for HDTV Projection Displays", SPIE vol. 1255 Large Screen Projection Displays II, pp, pp. 69–78, 1990.

Gerhard–Multhaupt, "Light–Valve Technologies for High–Definition Television Projection Displays", Displays, vol. 12, No. 3/4, pp. 115–128.

Alvelda et al., "Ferroelectric Microdisplays Using Distortion–Compensated Pixel Layouts," SID 95 Digest, pp. 931–933, 1995.

Phillip Alvelda, "High–Efficiency Color Microdisplays," SID 95 Digest, pp. 307–311, 1995.

Worboys et al., "Miniature Dispaly Technology for Integrated Helmut Systems," GEC Journal of Research, vol. 10, No. 2, pp. 111–118, 1993.

Farn et al., "Color Separation by use of Binary Optics," Optics Letters, vol. 18:15, pp. 1214–1216, 1993.

Phillip Alvelda, "VLSI Microdisplays and Optoelectric Technology," MIT, pp. 1–93, May, 1995 Massachusetts Inst. Technology.

Phillip Alvelda, "VLSI Microdisplay Technology," May, 1994. Massachusetts Inst. of Technology.

O.Solgaard, F. Sandejas, and D. Bloom, "Deformable Grating Optical Modulator," Optics letters, vol. 17, No. 9, New York, USA, pp. 688–690, May 1, 1992.

NON-DIFFRACTING UP STATE PIXEL

DIFFRACTIONG DOWN STATE PIXEL

EMBOSSED DIFFRACTION GRATING ALONE AND IN COMBINATION WITH CHANGEABLE IMAGE DISPLAY

FIELD OF THE INVENTION

This invention relates to the field of display technologies. More particularly, this invention relates to the field of displaying an image representing high information content formed as of an embossed diffraction grating alone and as a combination of two optically overlaid images, one from the embossed diffraction grating and one from a dynamic image source.

BACKGROUND OF THE INVENTION

For displaying high information content images in conventional display technologies, a plurality of pixels is organized into an array of addressable columns and rows. For a color display, each pixel is organized into a cluster of sub-pixels, each individually activated to form a desired color. The pixels are activated in a predetermined manner to generate an image. Color can also be generated by sequentially activating the various colors, for example from three light sources, and integrating those colors over time.

Consider for example a digitized image representing a full-color detailed map of a major metropolitan area. To store the digital information necessary to display such a map could require several gigabytes of memory. At present, the only convenient and economical way to store memory of such a quantity is to use CD-ROM technology. To form a display using conventional technology, the data would be read from the CD-ROM and used to activate the pixels in a predetermined manner.

If the information changes, the memory must correspondingly change to display an accurate image. For the example of the metropolitan map discussed above, to be useful in a driving situation, the map would preferably include information such as the location of traffic problems, road construction, public activities that would impede traffic and the like. Because CD-ROMs cannot be changed once written, a substitute CD-ROM must be provided. Unfortunately, traffic conditions change too often for such a system to be useful. What is needed is a display system that allows for mass storage of digital information that can be readily altered. Substituting memory for the CD-ROM technology would allow alterability of the displayed image but would dramatically increase the cost of such a system.

In one display technology grating light valves can selectively diffract an incident beam of light. A variety of known grating light valves are discussed in the prior art and some others are or were commercially available. One grating light valve is described in U.S. Pat. No. 5,311,360. A similar grating light valve and a method of making it are described in two U.S. patent applications, Ser. No. 08/482,188 entitled: FLAT DIFFRACTION GRATING LIGHT VALVE, now U.S. Pat. No. 5,841,579 and Ser. No. 08/480,459 entitled: A METHOD OF MAKING AND AN APPARATUS FOR A FLAT DIFFRACTION GRATING LIGHT VALVE, now U.S. Pat. No. 5,661,592 both filed on Jun. 7, 1995. Each of these three patent documents is incorporated herein by reference. The discussion that follows is in no way intended to modify or alter the scope of the teachings or claims of any of the above three captioned references. Rather, this discussion is intended only to schematically describe these references insofar as it will aid in understanding the present invention by providing bases for comparing or contrasting those technologies to the present invention. The technology disclosed in these three patent documents is generically referred to herein as grating light valve (GLV) technology.

According to the teachings of these three references, a diffraction grating light valve is formed of substantially parallel ribbon structures. The ribbons are formed over a semiconductor substrate using certain conventional semiconductor processing steps such as those used for forming integrated circuits as will as other steps. FIG. 1 shows the grating light valve 10 from the U.S. Pat. No. 5,311,360. Each of the ribbons 18 have an upper surface coated with a reflective material 20, such as aluminum. In the spaces between the ribbons, the substrate 16 is also coated with the reflective material 24. The height difference between the reflective material 20 on the ribbons 18 and the reflective material 24 on the surface of the substrate 16 is ½ the wavelength $\lambda$ of an expected beam of light. Because of this height difference, the beam of light reflects from the surface of the grating light valve essentially as if it were a specular mirror as shown in FIG. 2.

Upon applying a predetermined voltage potential across the ribbons 18 and the substrate 16, the ribbons 18 are caused to deflect downwards and contact the substrate 16. The grating light valve 10 is constructed so that the height difference in this deflected state is ¼ the wavelength $\lambda$ of the expected beam of light. Because of this height difference, the beam of light is diffracted at the surface of the grating light valve essentially as shown in FIG. 3.

FIG. 4 shows a cross section view of two adjacent ribbons according to the technology taught in the two above captioned patent applications in an undeflected and reflecting state. According to the applications, in an undeflected state all the ribbons are in an up position. All the reflecting surfaces are on ribbons rather than having alternate ones of the reflectors mounted on the substrate as in U.S. Pat. No. 5,311,360. The ribbons are selectively deformable by coupling the ribbons to external control circuitry. When the ribbons for a single grating light valve are all in an up position, an essentially flat specular mirror is presented to an incident beam of light. The mirror is necessarily broken by the gaps between the ribbons of a single grating light valve structure.

FIG. 5 shows a cross section view of two adjacent ribbons in a deflected and diffracting state. Alternate ones of the ribbons within a single grating light valve are selectively deformed and deflected into contact with the underlying substrate. When this occurs, the grating light valve diffracts the incident beam of light.

For the technologies described above, a voltage is coupled to the selected ribbon or ribbons and to the substrate (or an appropriate conductor mounted on the substrate) for effecting the deflection of one or more ribbons in a predetermined manner. An incident beam of light that strikes such deflected ribbons will form a diffracted beam. It will be understood that the light from the diffracted beam is collected at the diffracting angle. Thus, no light is collected and accordingly there is no or low intensity when the ribbons are not deflected and thus the grating light valve is acting as a specular mirror. When the ribbons are deflected, the incident beam of light is diffracted to the collection point and the collected intensity is large. To form an image using any of the grating light valve technologies discussed above, or those in the prior art require a source of digital memory for selectively controlling a display state in each pixel.

SUMMARY OF THE INVENTION

A display system is provided for displaying high information content images. The display system includes two optical image sources. A first optical image source provides a static never changing image. A second optical image source allows presentation of changing image data. An optical system merges the images from these two sources to form a unitary optical output. In the preferred embodiment, both display sources are diffraction grating display systems.

A static diffracting grating display system provides a fixed image representing high digital content information. A plurality of physical features are permanently fixed into the surface of a substrate to selectively reflect or diffract light from an incident beam of light. The physical features are positioned and oriented to selectively diffract or reflect a first incident beam of light which is then collected by a first display optical system. For color, preferably three light sources, red, green and blue, are used to form three first incident beams of light. In the alternative, a white light source can be used and a color image formed by selectively adjusting the period of the diffraction gratings to diffract only the desired wavelength of light into the collection optics. Preferably the diffracting features are formed by embossing a deformable substrate. Where the material of the deformable substrate is not reflective, a reflective coating is then applied. In some circumstances a protective overcoat is applied over the reflective surface to prevent scratches, tarnish or other damage from occurring to the diffracting/reflective features of the embossed surface. The diffracting features can also be formed using photolithographic techniques.

To display changeable information in the image, an alterable light valve is provided. The light valve is configured in an array of pixels for forming images. In the preferred embodiment, the light valve is a GLV. A second incident beam of light is provided to illuminate the GLV light valve. A second display optical system collects light from the deformable diffraction grating light valve and merges this light with that collected from the static diffracting grating display system to form a unitary display image.

DETAILED DESCRIPTION OF THE PREFERRED EMBODIMENT

Figure 1:
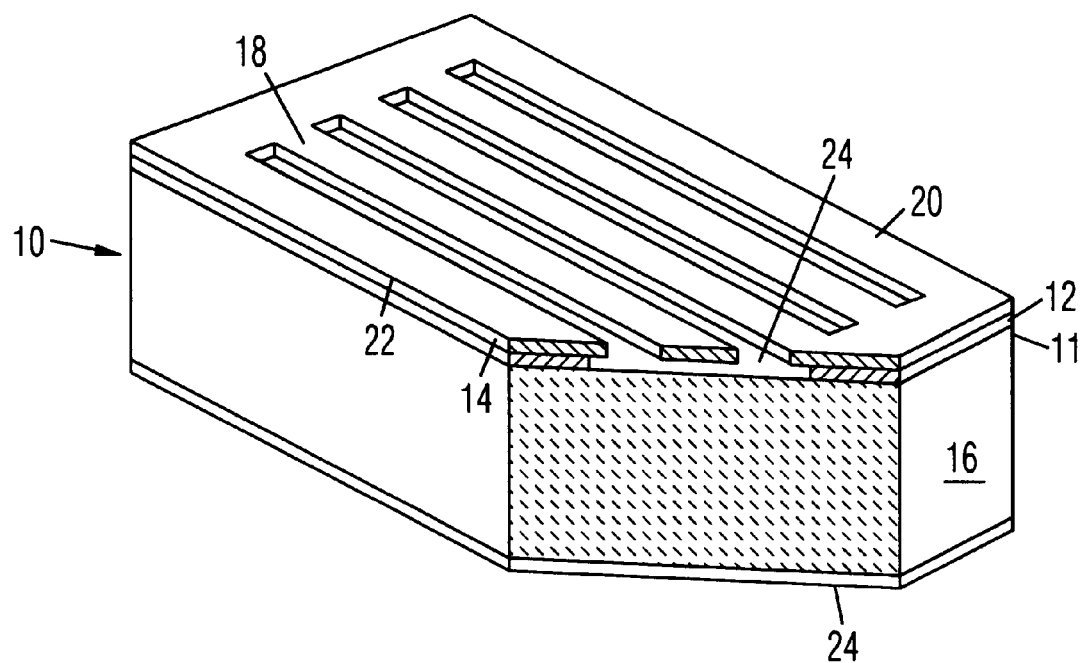
FIG. 1 shows a perspective view of a prior art grating light valve.
Figure 2:
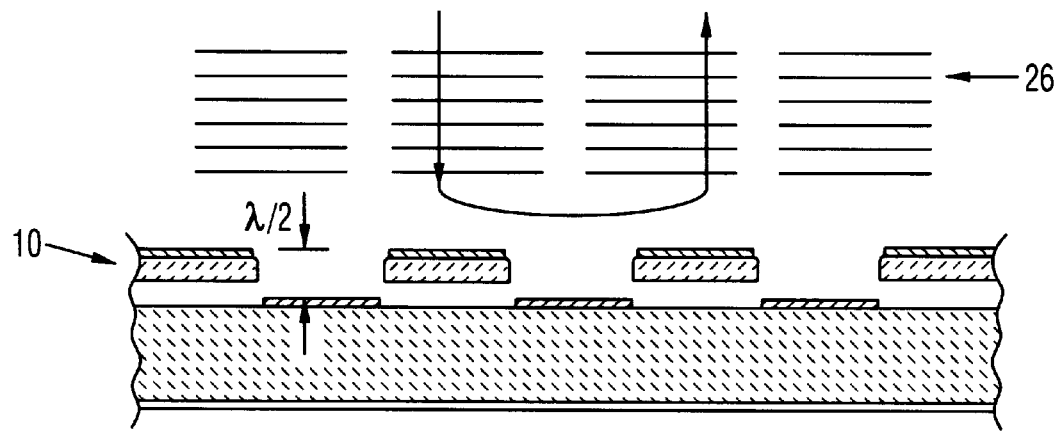
FIG. 2 shows a cross section view of the grating light valve of FIG. 1 in an undeflected and reflecting state.
Figure 3:
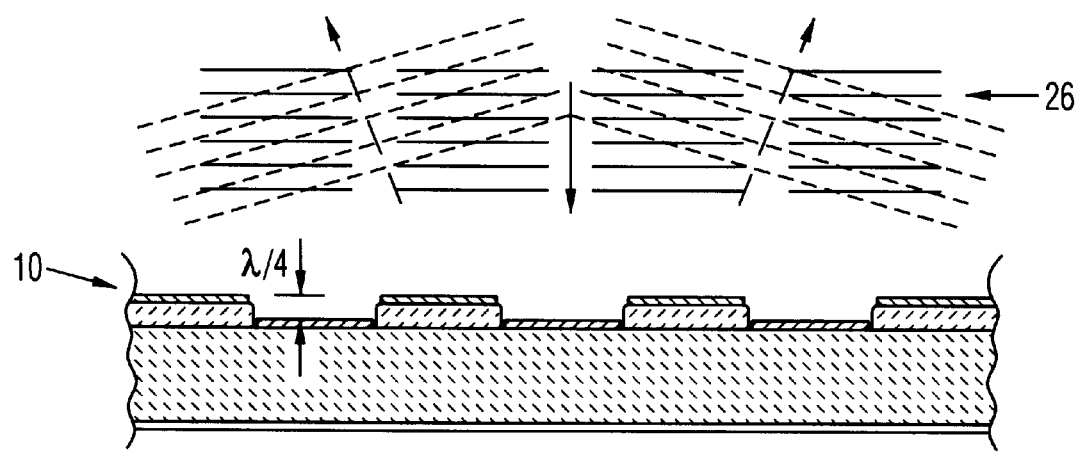
FIG. 3 shows a cross section view of the grating light valve of FIG. 1 in a deflected and diffracting state.
Figure 4:
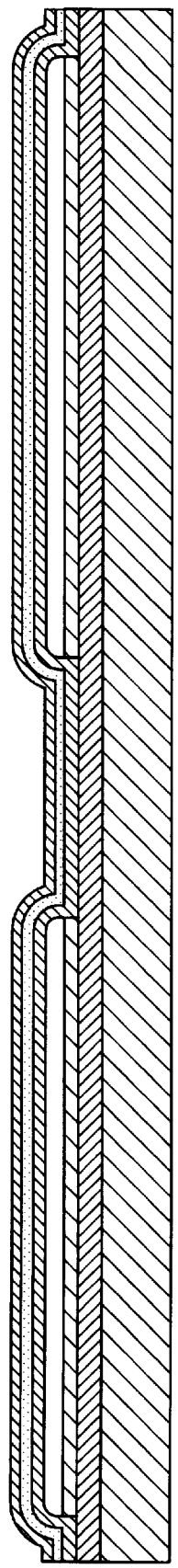
FIG. 4 shows a cross section view of two adjacent ribbons according to another technology in an undeflected and reflecting state.
Figure 5:
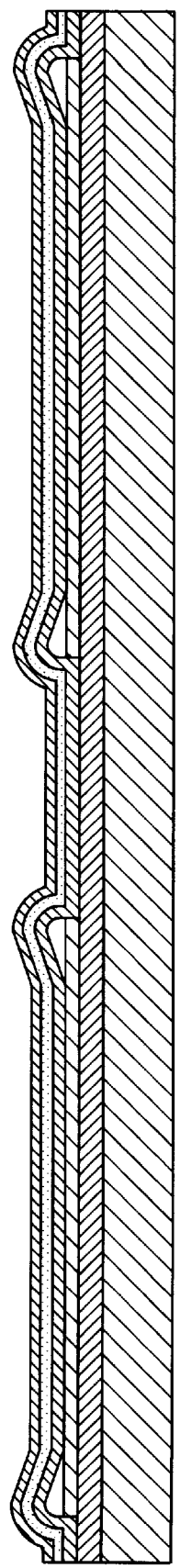
FIG. 5 shows a cross section view of the two adjacent ribbons of FIG. 4 in a deflected and diffracting state.
Figure 6:
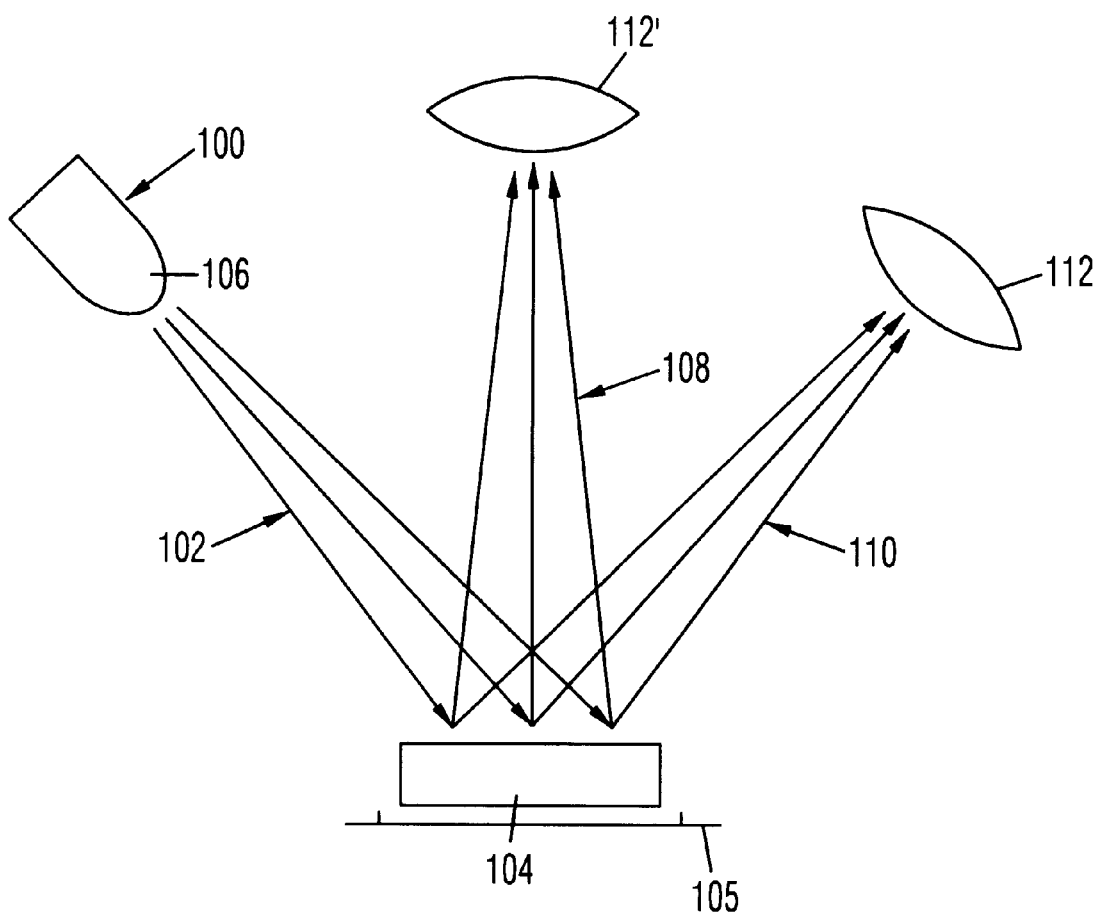
FIG. 6 shows a schematic representation of one embodiment of the present invention.

A static diffracting grating display system is configured to provide a fixed image representing high content digital information as shown in FIG. 6. It will be readily understood by persons of ordinary skill in the art that FIG. 6 is intended to be schematic only. A light source 100 generates a beam of light 102 that impinges onto the surface of a fixed image diffraction grating 104. A receiving apparatus 105 is configured to receive the fixed image diffraction grating 104. In at least one embodiment, the light source 100 is an LED having an integral lens 106 for focusing the generated light into a reasonably tight beam. For other applications, separate lens systems can be employed to alter the efficiency of the system.

The surface of the fixed image diffraction grating 104 is preferably formed as a plurality of pixel elements arranged into an array of columns and rows. Each pixel element is configured to selectively diffract 108 or reflect 110 the incident light beam 102 according to a predetermined design. An optical collection system 112 is positioned to collect the light that is reflected by the fixed image diffraction grating 104. It will be readily apparent to one of ordinary skill in the art that an alternative optical collection system 112' can be substituted for the optical collection system 112.

The collected light is then displayed to a viewer as an image. The image can be provided directly to a viewer's eye, such as with goggles, to a projection display system or to any other known display system.

Figure 7A:
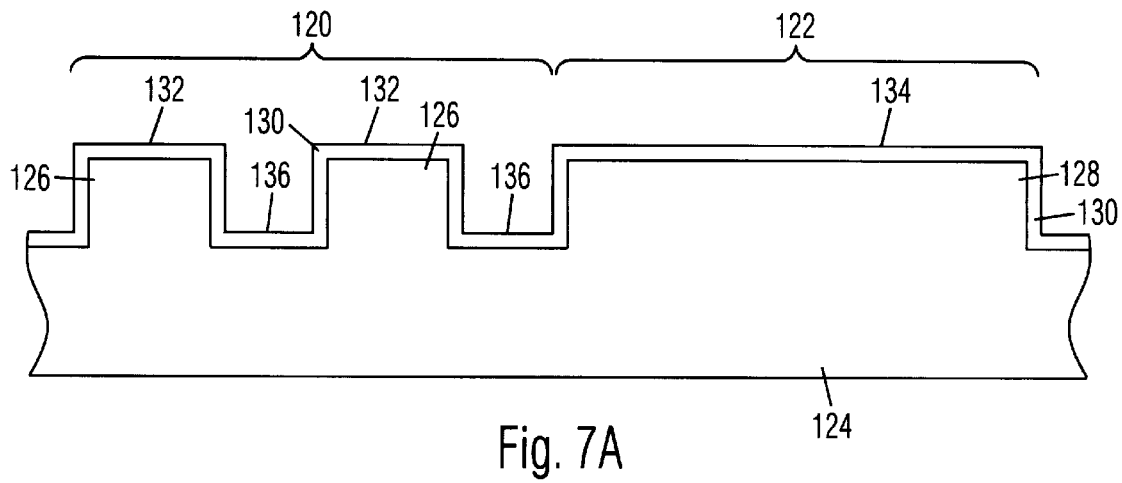
FIG. 7A shows a cross section view of two adjacent pixels according to a preferred embodiment of the present invention.
Figure 7B:
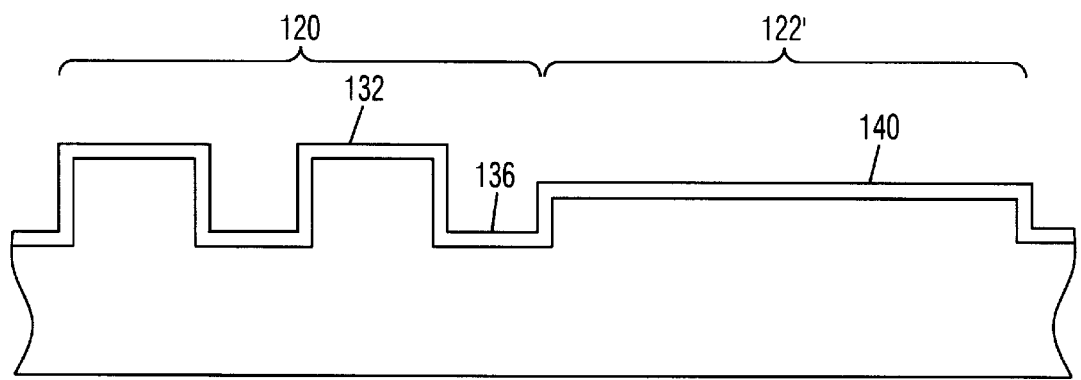
FIG. 7B shows a cross section view of two adjacent pixels according to an alternate embodiment of the present invention.
Figure 7C:
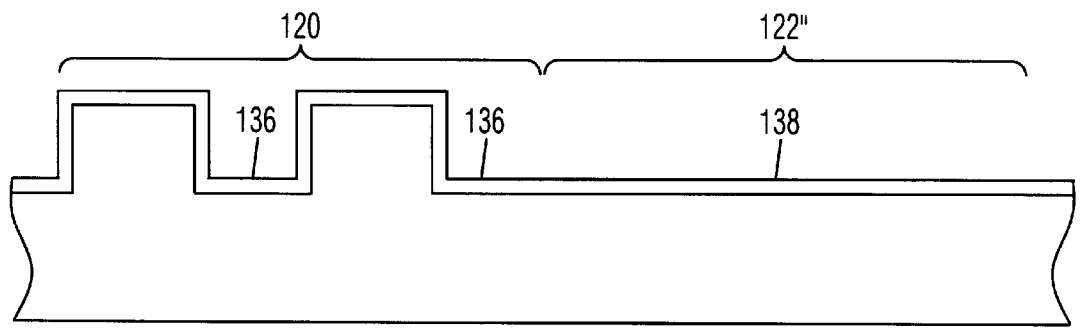
FIG. 7C shows a cross section view of two adjacent pixels according to an alternate embodiment of the present invention.

FIG. 7A shows a cross section view of the preferred embodiment of the present invention. Two adjacent pixel elements 120 and 122 are shown. Because the image to be displayed by the system of FIG. 7 is fixed, there is no need for any moving elements such as shown in FIGS. 1 through 5, above. The diffracting and reflecting elements are physically fixed onto the surface of the fixed image diffraction grating. A substrate 124 is provided. Diffracting elements 126 are formed over the substrate 124. Similarly, the reflecting elements 128 are also formed over the substrate 124. If the substrate 124 is formed of a material that is reflective of the incident beam of light, then the processing is complete. If the substrate 124 is formed of a non-reflective or poorly reflective material, then a coating of reflective material 130 is then applied over the top surfaces of the substrate 124, diffracting elements 126, and reflecting elements 128. According to FIG. 7A, the tops 132 of the diffracting elements 126 are coplanar with the upper surface 134 of a reflecting element 128. In FIG. 7C, the valleys 136 of the diffracting elements are coplanar with the upper surface 138 of the reflecting element 122". In FIG. 7B, the upper surface 140 of the reflecting element 122' is formed to be at some intermediate level between the tops 132 and the valleys 136 of the diffracting elements 126.

The depth of a diffraction element according to the preferred embodiment, is $\lambda/4$ where $\lambda$ is the wavelength of the expected incident beam of light. In this way, the light reflected from the tops 132 and valleys 136 (FIGS. 7A through 7C) will interfere and thus diffract at an angle different than the specular reflection from a reflecting element 122, 122' or 122".

Figure 8A:
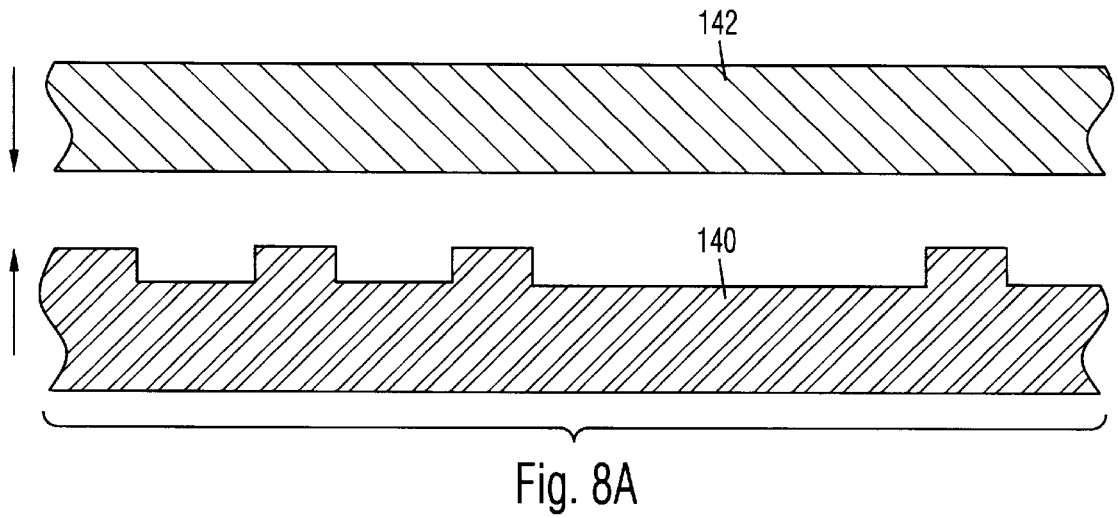
FIGS. 8A through 8D show cross section views during an embossing process according to the present invention.
Figure 8B:
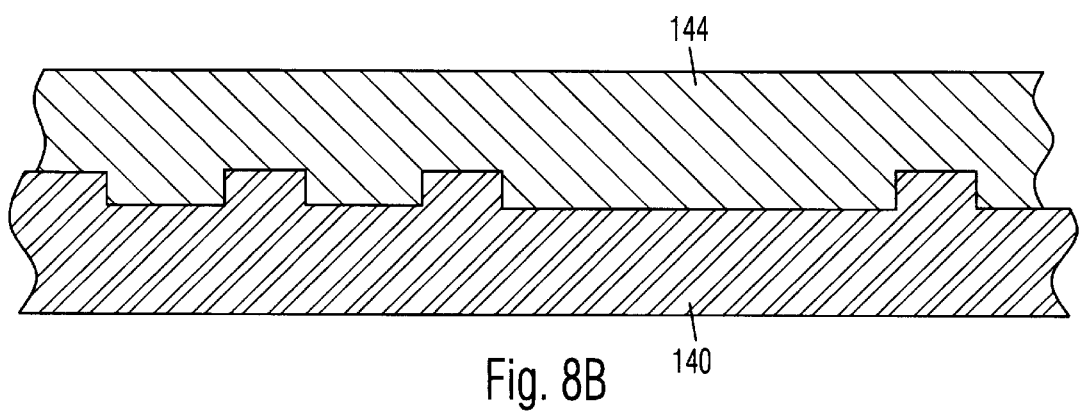
Figure 8C:
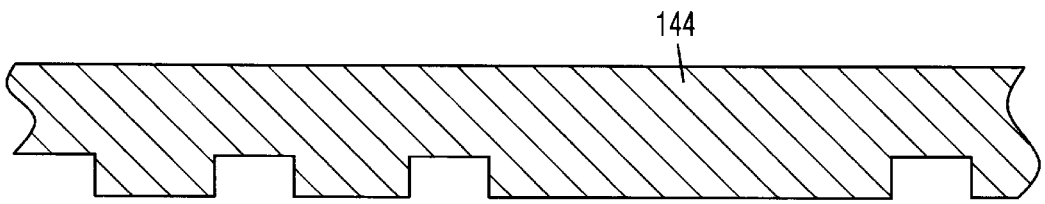
Figure 8D:
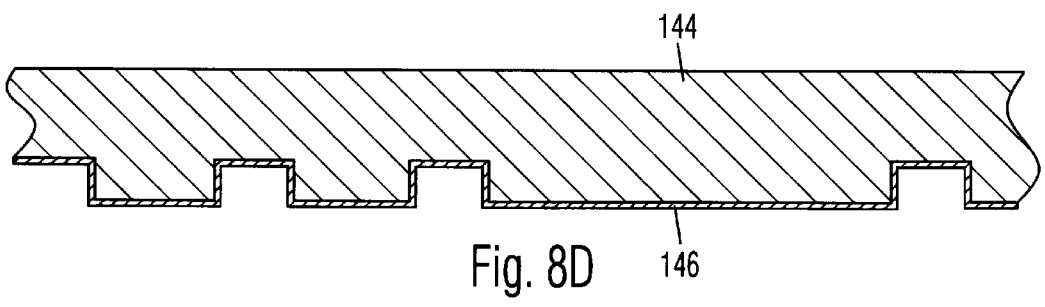

In the preferred embodiment, the substrate 124 is formed of a polymer based plastic. It will be apparent to those with ordinary skill in the art that a wide variety of other materials can be used for the substrate. Physical features can be formed on the substrate using methods such as etching, molding, or embossing. It will be apparent to those with ordinary skill in the art that other methods can be used as well. Preferably, physical features are mechanically imprinted onto the surface of the substrate 124 using an embossing technique, i.e., a physical transfer from an inverse image master as schematically shown in FIGS. 8A through 8D. The master 140 and a preformed block 142 of the substrate material are pressed together as shown in FIG. 8A. The substrate 144 is deformed into a reverse image of the surface of the master 140. The master is preferably formed of a material significantly harder than the substrate material to maximize the life of the master. In most instances, the master will be coated with a non-stick material to enhance release of the master 140 from the substrate 144 after the embossing operation as shown in FIG. 8C. To enhance the release of the master 140 from the substrate 144 it is possible to form a modest slope in the sidewalls of the master 140.

After the embossing step, the embossed surface of the substrate 144 is coated with a layer 146 of reflective material. The layer 146 can be formed using any convenient technique such as chemical vapor deposition. The layer 146 is preferably formed of aluminum but can also be formed of other reflective metals, materials or multilevel dielectrics. By using anisotropic deposition techniques, the sidewalls of the diffraction elements will not be coated with the reflecting material. In this way the final dimensions of the embossed surface of the substrate 144 will be the same as the embossed dimensions.

Other techniques can also be used for forming the fixed image diffraction grating elements of the present invention. For example, the diffraction features can be formed using conventional photolithographic processing steps. However, it is anticipated that the most cost effective method of forming the fixed image diffraction grating will be to use embossing.

According to the preferred embodiment, the width of a pixel element is 10 microns with the tops of the diffracting elements 126 at 3.5 microns and the valleys 1.5 microns. Conventional embossing techniques can be used to form features of this size.

Figure 9:
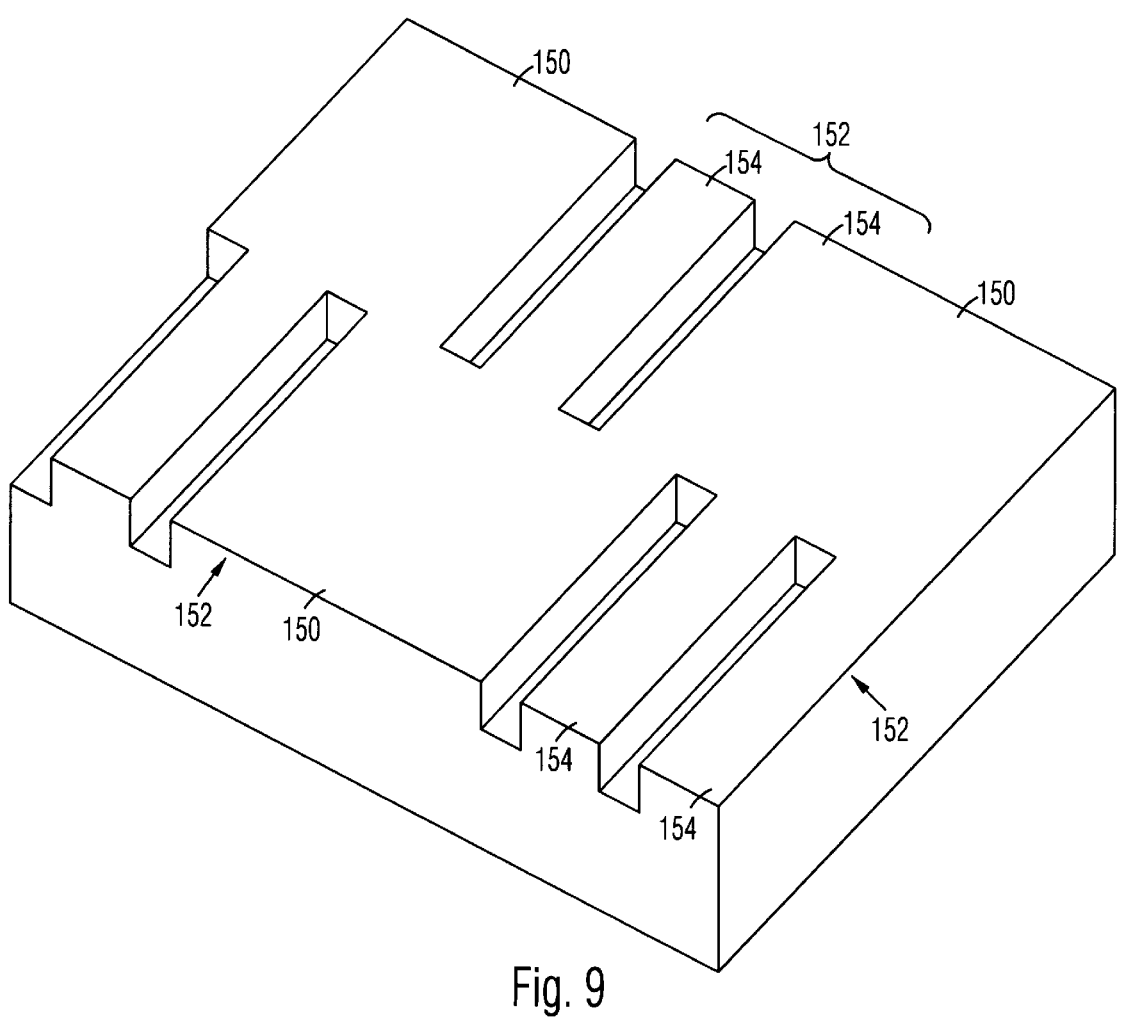
FIG. 9 shows an array of six pixels according to the preferred embodiment.

The diffraction grating elements of the preferred embodiment are ridge shaped. A truncated array is shown in FIG. 9 having six pixels. Three reflecting pixels 150 and three diffraction pixels 152 are arranged in a checkerboard pattern. The three reflecting pixels 150 are shown as shaded regions. The diffracting pixels 152 do not require any border structure such as required in U.S. Pat. No. 5,311,360 because there are no bridges to be supported. Because of this, the efficiency of each diffraction pixel is improved over a moveable bridge technology.

Figure 10:
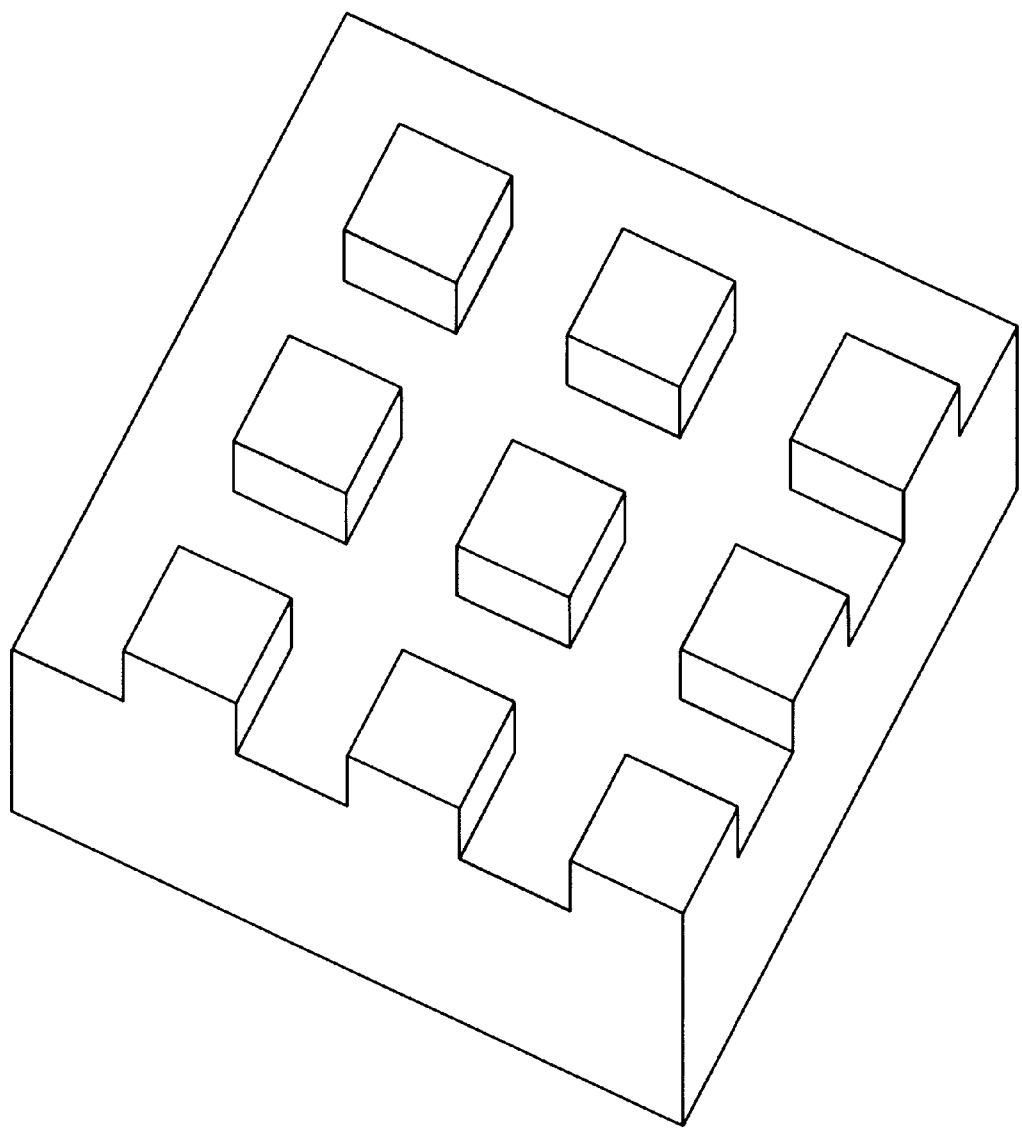
FIG. 10 shows an alternate fixed image diffraction grating pixel.

Other diffraction grating topologies can also be used. Indeed, any reflective structure having a height differential of λ/4 and an appropriate period will diffract light from an incident beam. For example, FIG. 10 shows a single pixel structure having an alternating checkerboard diffraction grating rather than a ridged structure such as shown in FIG. 9.

Figure 11:
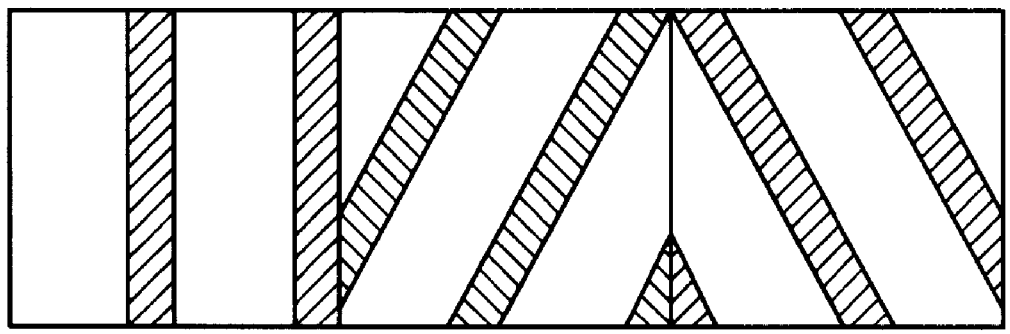
FIG. 11 shows a composite color pixel.

The diffracting pixels best diffract light that impinges on the surface of the fixed image diffraction grating at a direction perpendicular to the ridges 154. This fact can be used to develop a composite color pixel. One example of such a pixel is shown in FIG. 11. Three set of ridges are formed on the surface of a substrate to form a single pixel. The valleys are shown as shaded regions. Each set of ridges are formed at a different angle, one to the other. Preferably, the ridges of each set are oriented at 120° to one another. Three colored light sources, red, green and blue, are then positioned around the fixed image diffraction grating to impinge light onto the surface of the grating from three locations at 120° from one another. To form the various shades and hues of color, the intensity of the three colors for each pixel can be individually adjusted.

Using the structures described above, a user can display an image having high digital information content yet require no digital memory or digital information. Under certain circumstances, a user will want to have the ability to alter the displayed image. For a digital display system, this of course will require digital information. When the user is in a remote location, it will typically be inconvenient or impractical to download sufficient digital information to form a high digital information content image.

To solve this problem, the present invention preferably provides a combined fixed image diffraction grating and grating light valve. It will be understood by one of ordinary skill in the art that any alterable image technology can be substituted for the alterable image generation technology of the preferred embodiment.

Figure 12:
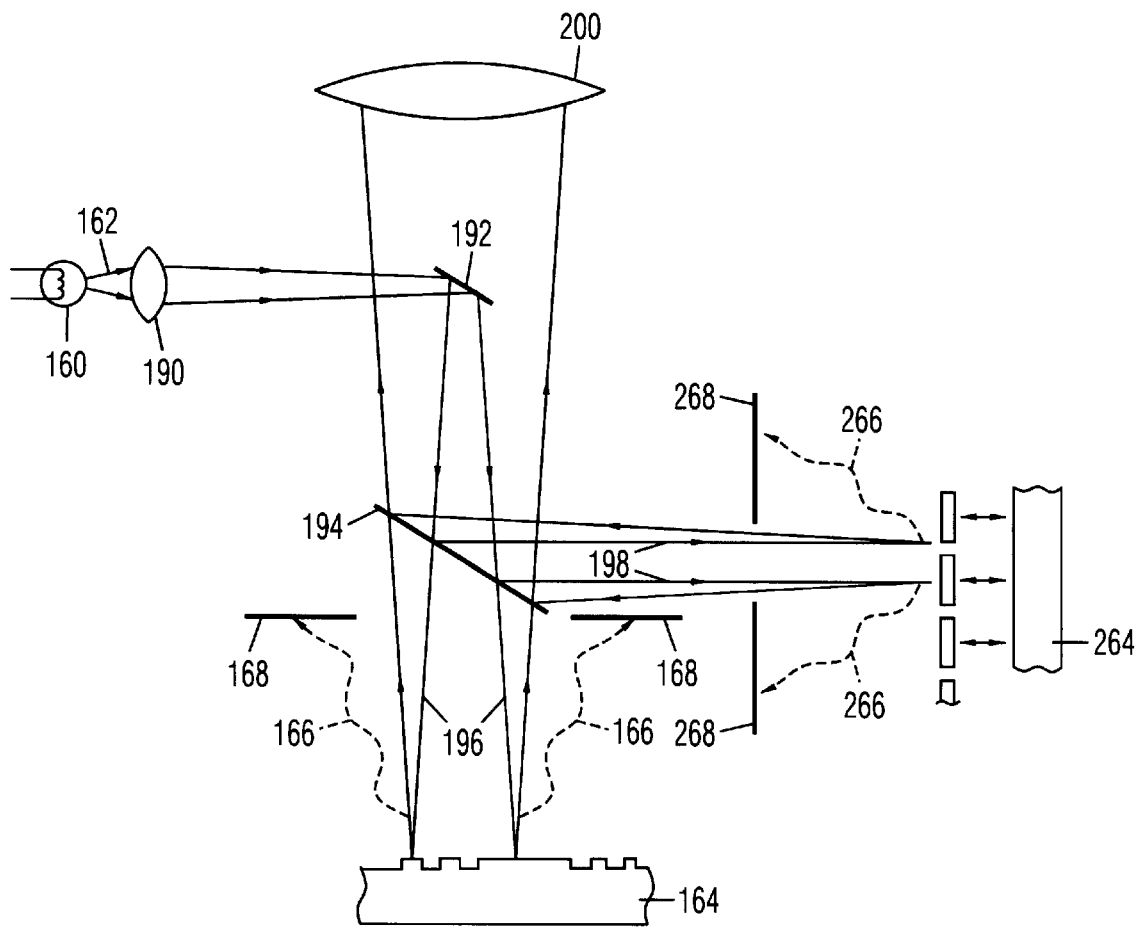
FIG. 12 shows a schematic representation of a composite fixed image diffraction grating and grating light valve system.
Figure 13:
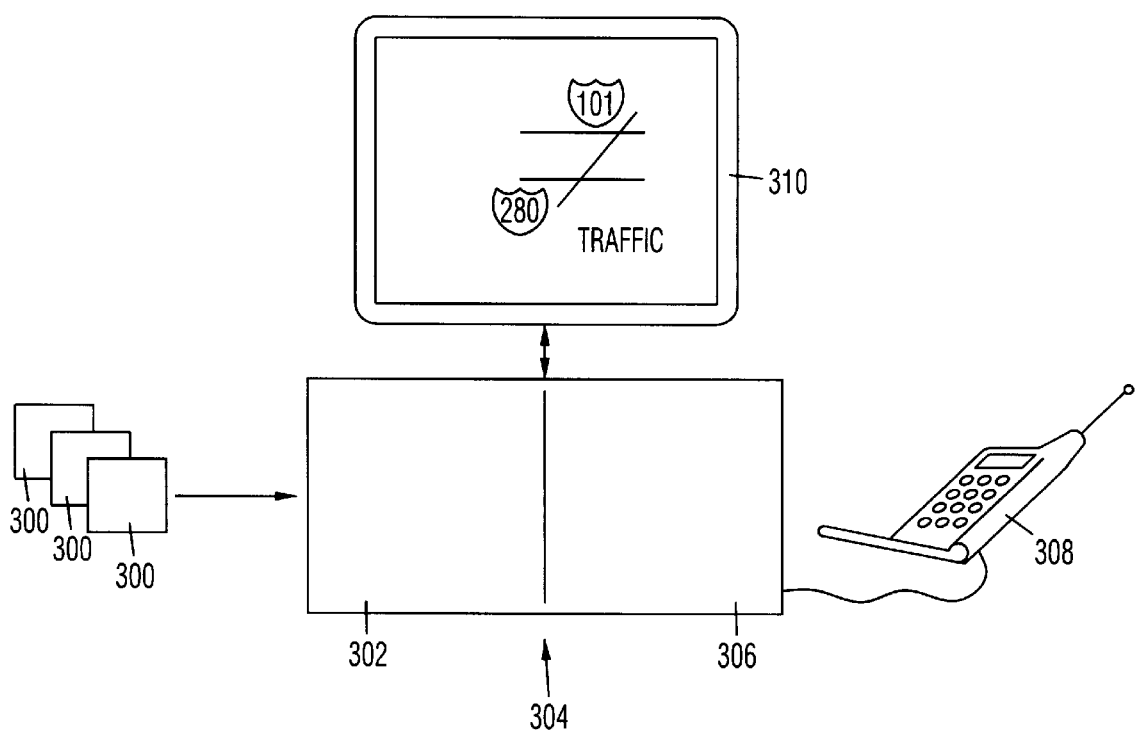
FIG. 13 shows a block diagram of an application incorporating the system of FIG. 12.

FIG. 12 shows a representative system according to the present invention. A fixed image diffraction grating system is provided and performs substantially as described above. For simplicity, only a single light source 160 is shown. However, it will be apparent to one of ordinary skill in the art that multiple light sources can be included to form color images as previously described. The light source 160 generates a beam of light 162 which passes through a collimating lens 190 and then impinges onto the surface of a turning mirror 192. The light is turned through a predetermined angle and passes through a beam splitter 194. A first portion of the light 196 impinges onto the surface of a fixed image diffraction grating 164. In this embodiment, the reflected light is collected. The diffracted light 166 (shown as ghost lines) is blocked by shields 168. A second portion of the light 198 is directed by the beam splitter 194 onto the surface of a grating light valve system 264. The diffracted light 266 (shown as ghost lines) is blocked by shields 268. A color system can be substituted for the grating light valve system as with the fixed image diffraction grating system. The light reflected by the fixed image diffraction grating 164 and by the grating light valve system 264 are combined by the beam splitter 194 and pass by the turning mirror 192 to strike the collection optics 200. The collection optics is schematically shown as a convex lens but can be any combination of optical elements as necessary to present the image for display.

An example of a use for such a system is a road map advice unit. The user has one or more fixed image diffraction grating maps 300 each showing the roads in a particular region. One such fixed image diffraction grating map 300 is loaded into the fixed image diffraction grating system 302 of a combined display system 304. The user can download specific traffic and/or road condition information for display by the grating light valve system 306. The user can download the information for example using a cellular telephone and modem system 308. In this way only a modest amount of data need be downloaded for display. The images from the fixed image diffraction grating system 302 and from the grating light valve system 306 are combined and present in a single display 310. The display 310 can be any convenient display such as a display screen or heads up display.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in a plurality of different ways and the apparatus disclosed above is only illustrative of the preferred embodiment of the present invention and is in no way a limitation.

What is claimed is:

1. A display system comprising:
   a. a light source for generating a beam of light;
   b. a first substrate positioned to receive the beam of light, the first substrate having a first plurality of surface features preconfigured to reflect and diffract the beam of light, the first substrate forming first diffracted light representative of a fixed image and first reflected light;
   c. a second substrate positioned to receive the beam of light, the second substrate having a second plurality of surface features selectively configurable to reflect and diffract the beam of light, the second substrate forming second diffacted light representative of a changeable image and second reflected light;
   d. means for blocking the first and second reflected light and for collecting the first and second diffracted light forming collected light; and
   e. means for displaying an image representative of the collected light.

2. The system according to claim 1 wherein the first plurality of surface features comprises a diffraction grating.

3. The system according to claim 2 wherein the diffraction grating is a fixed diffraction grating.

4. The system according to claim 1 wherein the light source further comprises a plurality of light sources, each configured for generating light of a different set of frequencies, and further wherein portions of the first and second plurality of surface features are preconfigured to diffract light of one of the different set of frequencies to the means for collecting.

5. The system according to claim 4 wherein the first plurality of surface features comprise a diffraction grating.

6. The system according to claim 5 wherein the diffraction grating is a fixed diffraction grating.

7. The system according to claim 4 wherein the second plurality of surface features comprises a movable diffraction grating.

8. The system according to claim 1 wherein the second plurality of surface features comprises a movable diffraction grating.

9. An apparatus for displaying an image comprising:
   a. a light source for generating a beam of light;
   b. a first receiving apparatus configured to receive a first substrate such that the beam of light impinges on the first substrate, and further first substrate is configured with a first plurality of surface features configured to reflect and diffract the beam of light, the first substrate forming first diffracted light representative of a fixed image and first reflected light;
   c. a second receiving apparatus configured to receive a second substrate such that the beam of light impinges on the second substrate, and further wherein the second substrate is configured with a second plurality of surface features configured to selectively reflect and diffract the beam of light, the second substrate forming second diffracted light and second reflected light;
   d. means for blocking the first reflected light and for collecting the first diffracted light forming first collected light; and
   e. means for blocking the second reflected light and for collecting the second diffracted light forming second collected light; and
   f. means for displaying a composite image representative of the first and second collected light.

10. An apparatus for displaying an image comprising:
    a. a fixed image diffraction grating subsystem comprising:
       (1) a first light source for generating a first beam of light;
       (2) a receiving apparatus configured to receive a substrate such that the beam of light impinges on the substrate, and further wherein the substrate in configured with a first plurality of surface features selectively preconfigured to reflect and diffract the beam of light forming first diffracted light and first reflected light; and
       (3) first means for blocking the first reflected light and for collecting the first diffracted light forming first collected light;
    b. a light modulation image subsystem comprising:
       (1) means for generating a second beam of light;
       (2) means for modulating the second beam of light to form a modulated light image; and
       (3) means for collecting the modulated light image forming second collected light;
    c. means for merging the first collected light and the second collected light forming a composite image; and
    d. means for displaying the composite image.

11. The apparatus according to claim 10 wherein the first plurality of surface features comprises a set of fixed diffraction gratings.

12. The apparatus according to claim 10 further comprising a plurality of first light sources, each first light source for generating light of a different set of frequencies wherein portions of the first plurality of surface features are preconfigured to diffract light of one of the set of frequencies to the first means for collecting.

13. The apparatus according to claim 12 wherein the first plurality of surface features comprises a set of fixed diffraction gratings.

14. The apparatus according to claim 10 further comprising a plurality of second light sources, each second light source for generating light of a different set of frequencies wherein the means for modulating the second beam of light includes a second plurality of surface features wherein portions of the second plurality of surface features are preconfigured to diffract light of one of the set of frequencies to the second means for collecting.

15. The apparatus according to claim 14 wherein the second plurality of surface features comprises a set of configurable diffraction gratings.

16. The apparatus according to claim 15 wherein portions of the set of configurable diffraction gratings are preconfigured to diffract light of one of the set of frequencies to the means for collecting modulated light by adjusting a period of the portions of the set of configurable diffraction gratings.

* * * * *

UNITED STATES PATENT AND TRADEMARK OFFICE
CERTIFICATE OF CORRECTION

PATENT NO. : 6,101,036

DATED : Aug. 8, 2000

INVENTOR(S) : David M. Bloom

It is certified that error appears in the above-identified patent and that said Letters Patent is hereby correct as shown below:

<u>IN THE FOREIGN PATENT DOCUMENTS</u>

On the cover page, delete "0 417 639 A1" and insert --0 417 039 A1--.

<u>IN THE CLAIMS</u>

In column 7, line 63, delete "further first substrate" and insert --further wherein the first substrate--.

Signed and Sealed this

Seventeenth Day of April, 2001

*Attest:*

NICHOLAS P. GODICI

*Attesting Officer*   Acting Director of the United States Patent and Trademark Office